3,021,955
FILTER UNIT WITH RESTRICTOR MEANS
John Joyce, New Brunswick, N.J., assignor to Purolator Products, Inc., Rahway, N.J., a corporation of Delaware
Filed Jan. 6, 1959, Ser. No. 785,179
1 Claim. (Cl. 210—132)

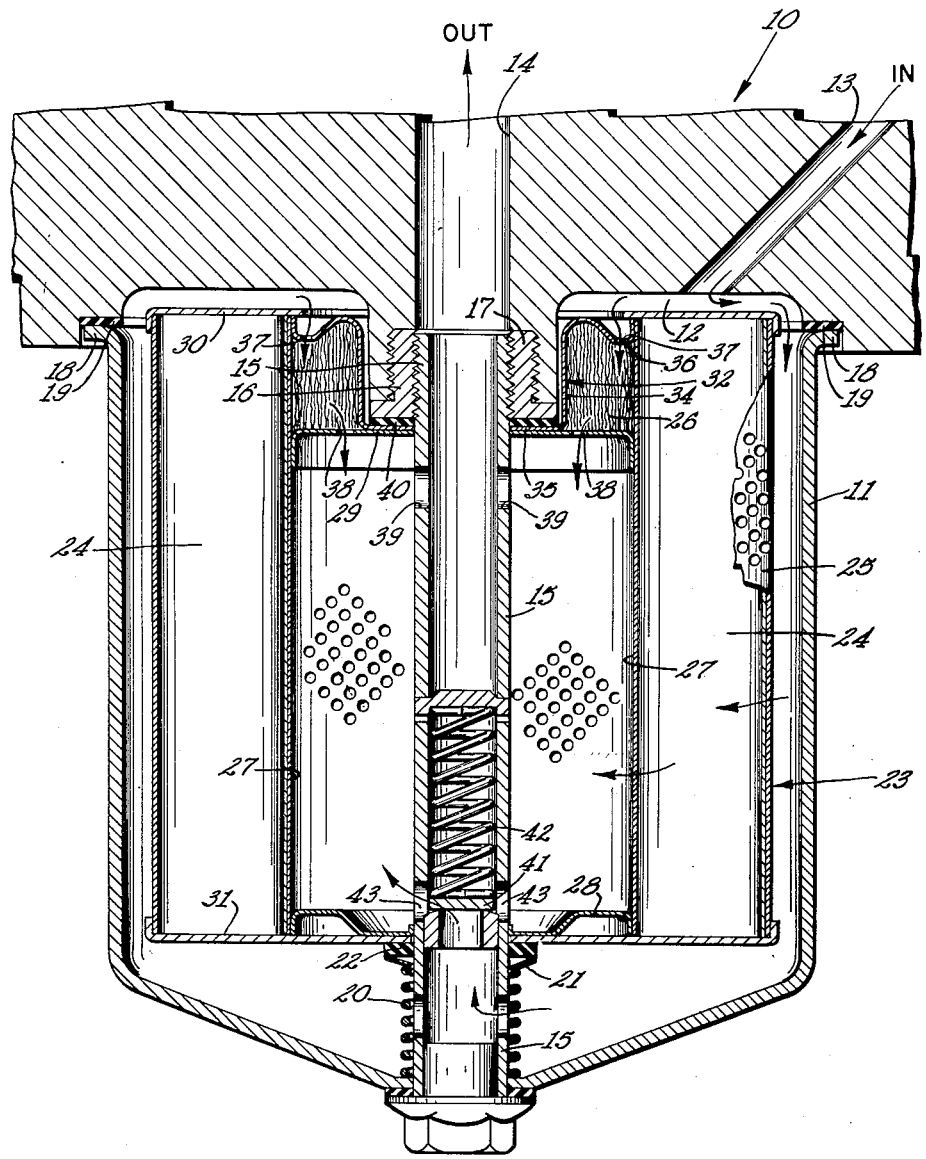

The present invention relates to a filter and more particularly to a full flow type filter.

In accordance with the present invention a full flow type filter takes the total flow of lubricating fluid from an engine, and imparts to it a high degree of filtration before returning it to the engine while restrictor means regulate the flow of oil through the filter element assembly so that the engine is not starved of filtered oil and the allowable pressure drop is not exceeded. This is accomplished by providing a main high efficiency fine filter element within which is disposed a small less fine filter element having restrictor or control means to regulate the flow through this inside element and thereby through the whole unit. The restrictor means is connected to the same inlet and outlet points as the fine filter element and hence, the unit produces the efficiency of a full flow filter element made with high efficiency paper while preventing a relatively high pressure drop across the unit in a short time so that a much longer life is obtained than in conventional units having the same degree of filtration.

An object of the present invention is to provide a filter element having coarse and fine filtration elements therein with restrictor means regulating the divided flow through the two elements or circuits.

Another object of the present invention is to provide a filter unit having a fine filter element and a coarse filter element combined with each other into a single cartridge that may be readily replaced when the element becomes clogged.

Other objects and advantages of the present invention will be readily apparent when considered in connection with the accompanying drawing forming a part thereof and in which the invention is illustrated in an elevational sectional view.

Referring to the drawing the reference numeral 10 designates the engine block of an internal combustion engine having a cylindrical filter casing 11 mounted thereon. The engine block is provided with an annular inlet chamber 12 therein through which oil from the engine parts is passed through an inlet passage 13 from the oil pump not shown. Clean oil is returned to the engine bearings and other parts requiring lubrication through a discharge passage 14.

Casing 11 is mounted on the engine block by means of a hollow bolt or sleeve 15 provided with a bolt plug 16 in one end and threads on the other end adapted to engage a threaded adapter member 17 in the engine block. The bolt plug 16 is secured to sleeve 15 by brazing, welding or the like. The casing 11 is open at one end and is provided with an outturned flange 18 thereon which seats against a gasket 19 disposed on a shoulder formed in the engine block adjacent annular chamber 12, so that when sleeve 15 is threaded home against the engine block the gasket 19 forms a tight seal between the casing and block. A compression spring 20 is mounted on sleeve 15 in the bottom of casing 11 and has an annular filter support member 21 provided with a gasket 22 disposed thereon for supporting an annular filter element 23 in the housing.

The main flow filter element of the present invention comprises an annular resin impregnated pleated paper fine filter 24 having a perforated body wrapper 25 wrapped therearound, and a secondary less fine or coarser annular filter element 26 disposed inside and adjacent the upper end of element 24. A perforated center tube 27 is disposed inside the pleated convolutions of element 24 and has an annular support plate 28 fixed to the bottom thereof and an upper support plate 29 joined thereto adjacent the upper portion of the pleats. An annular end cap or disc 30 seals off the upper edges of the filter pleats while a solid or circular end cap 31 seals off the lower edges of the pleats. The openings provided in members 28 and 29 and end cap 31 are of sufficient size so that the filter element may be easily mounted on sleeve 15 when the filter element is serviced or replaced.

The coarse or by-pass filter element 26 comprises a fibrous filter mass such as sisal or the like enclosed in an annular casing or shell 32 defined by member 29, the portion of center tube 27 adjacent the upper end of element 24, and a vertical member 34 having an inturned lower end 35 secured to member 29, and an outturned upper end or laterally extending portion 36 terminating in a peripheral rim secured to the adjacent center tube 27. The flow through element 26 is by way of restrictor or control ports or apertures 37 spaced in portion 36 of member 34. Discharge ports 38 having a larger cross sectional area than ports 37 are provided in member 29 for discharging oil passed through element 26 to center tube 27. Clean oil is discharged from the center tube through outlet ports 39 in sleeve 15. An annular gasket 40 disposed on member 29 prevents any leakage of oil around the top of the filter unit. Incoming oil from passage 13 flows around the outside of the filter unit with a smaller portion of it passing through inlet ports 37 and the major portion flowing in an outside-in direction through wrapper 25 and the pleats of element 24. A predetermined quantity of the total oil flow flows through the sisal element by controlling the size and number of ports. Preferably, ports 37 are constructed to permit 10 to 15 percent of the oil to flow therethrough.

A relief valve comprising a valve disc 41 held seated by a compression spring 42 is disposed in center tube 15 should the filter element become clogged. Flow past the relief valve is through spaced ports 43 in sleeve 15 adjacent the inlet and outlet sides of disc 41.

The pleated paper of filter element 24 is a very fine or tight filter for high efficiency filtration but the pressure drop across this filter element is high. This means that the engine parts will not have sufficient filtered lubricating oil supplied to them upon cold starting of the engine when the oil viscosity is high or else the relief valve will open and permit contaminated oil to contact vital parts. Because of the high filtration efficiency the paper pleats will become quickly clogged and produce a pressure drop thereacross below desired standards in a very short time thus reducing the serviceable life of the pleated paper.

The present invention alleviates these conditions by providing a more porous filter element 26 formed integral with the paper filter and regulating the relative flow of oil through the two filter elements by the diameter of the restrictor ports 37 and the number of ports provided therein. In this way, a certain amount of filtered oil is always provided to the engine and since the oil is continuously recirculated through the filter unit, all of it will eventually pass through the fine pleated paper filter and be progressively filtered to a high degree of efficiency while preventing an excessive pressure drop and giving the element a longer serviceable or useful life than heretofore provided in conventional filters.

When the filter element becomes clogged so that it needs replacement, it is merely necessary to unthread sleeve 15 from adapter 17 and remove casing 11 from the engine block after which filter 23 is removed from sleeve 15 and a fresh element placed thereon and the casing again mounted against the engine block.

Thus, the present invention provides a large fine filter element and a smaller less fine filter element in series with a restrictor connected to the same inlet and outlet points as the fine element so as to make it easier to control the flow rate through the unit by means of apertures than with the porosity of the filter media.

Inasmuch as various changes may be made in the form, location and relative arrangement of the several parts without departing from the essential characteristics of the invention, it will be understood that the invention is not to be limited except by the scope of the appended claim.

What is claimed is:

An oil filter comprising an annular resin impregnated pleated paper element provided with a perforated center tube, an annular end cap sealing off one end of said element and a circular end cap on the opposite end, a filter shell disposed within said center tube having a perforated bottom wall and top wall and side walls formed by a vertical member and the center tube adjacent thereto, a fibrous filter mass in said shell, said top wall having spaced inlet ports therein, said ports being of a sufficient size to permit a predetermined quantity of oil passed through the filter to flow therein and by-pass said paper element.

References Cited in the file of this patent
UNITED STATES PATENTS

| | | |
|---|---|---|
| 2,230,174 | Beale | Jan. 28, 1941 |
| 2,559,267 | Winslow et al. | July 3, 1951 |
| 2,617,535 | Hamilton | Nov. 11, 1952 |
| 2,743,018 | Belgarde | Apr. 24, 1956 |
| 2,843,268 | Kennedy | July 15, 1958 |